J. S. PADON.
Wheel-Plow.
No 49,911. Patented Sept. 12, 1865
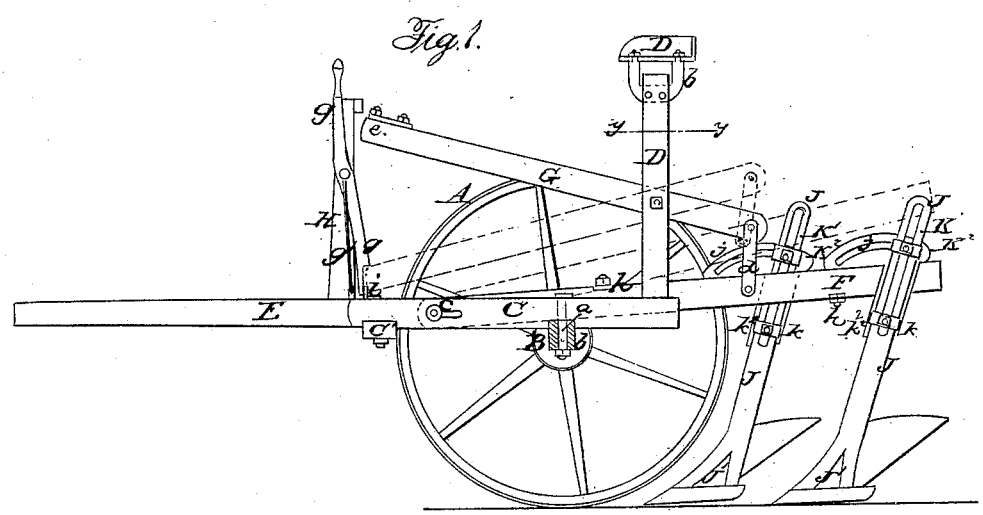
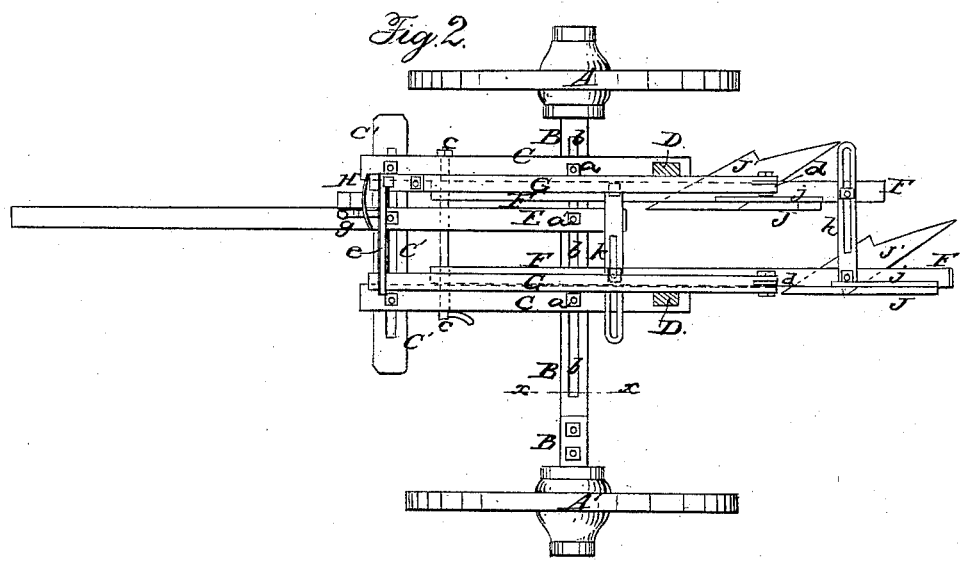
Inventor:
John S. Padon

UNITED STATES PATENT OFFICE.

JOHN S. PADON, OF SUMMERFIELD, ILLINOIS.

IMPROVEMENT IN GANG-PLOWS.

Specification forming part of Letters Patent No. 49,911, dated September 12, 1865.

*To all whom it may concern:*

Be it known that I, JOHN S. PADON, of Summerfield, in the county of St. Clair and State of Illinois, have invented a new and Improved Gang-Plow; and I do hereby declare that the following is a full, clear, and exact description thereof, reference being had to the accompanying drawings, making a part of this specification, in which—

Figure 1 is an elevation of my new gang-plow as seen by removing the land-wheel. Fig. 2 is a plan view of the machine complete.

Similar letters of reference indicate corresponding parts in the two figures.

The main object of my invention is to so construct a wheel gang-plow that the plows can both be adjusted laterally toward the land or furrow wheel, at the same time to provide for adjusting the plows, together with their supporting-frame, and setting these parts at any desired distance apart, according to the size of the plows or the width of furrow which it is desired to have, as will be hereinafter described.

Another object of my invention is to provide for securing the plow-standards rigidly to their respective supporting-beams, and also for adjusting these plows at any desired pitch, or elevating or depressing them with respect to the beams to which they are applied, as will be hereinafter described.

To enable others skilled in the art to understand my invention, I will describe its construction and operation.

In the accompanying drawings, A A' represent the carriage-wheels of the plow; and B B' are the axles, to which these wheels are applied. The wheel A', which is the land-wheel, is applied to the short axle B', that is secured on top of the main axle A, as shown in Fig. 2.

C C are two longitudinal beams, which are extended forward and backward of the axle A, and are secured on top of this axle by means of bolts $a\ a$, which pass through a slot, $b$, that extends nearly from one end to the other of the axle. The beams C C may be notched so as to fit over the axle A and enable me to make a rigid connection of the beams thereto. The forward ends of the beams C C are secured to a transverse brace, C', which is slotted to receive the clamping-bolts, as shown in Fig. 2.

Near the rear ends of the beams C C are two posts, D D, which project up therefrom, and support upon their upper ends the driver's seat D', which is secured to the posts by means of bolts projecting from ∪-shaped plates $b^2\ b^2$, one of which latter has its pins or bolts passed through oblong slots which are made through the seat, as shown in Fig. 1.

The draft-pole E is secured at its rear end to the axle A by means of a bolt, $a'$, which passes through the slot $b$ in said axle. The pole E is similarly secured to the transverse slotted brace C'.

The plow-beams F F are pivoted at $c\ c$ to the two beams C C, so that the rear ends of said beams are allowed to rise or fall, which movement is applied to them by means of levers G G, which are pivoted to the seat-posts D D and extend forward and backward of these posts, as shown in Figs. 1 and 2.

The rear or short arms of the levers G G are connected by pivoted links $d\ d$ to the plow-beams F F, and the forward ends of these levers are provided with a transverse bar, $e$, which is secured at one end only to one of the levers G. By depressing the forward ends of the levers G they will elevate the rear ends of the plow-beams, and by elevating the forward ends of these levers the plow-beams will be depressed. This operation may be performed by the feet of the driver while he is sitting in the seat D'. When the forward ends of the levers G are depressed they can be held in this position by means of a catch-lever, $g$, which is pivoted to a vertical post, H, that projects up from the draft-pole just forward of the transverse brace C', as shown in Fig. 1. Said catch-lever $g$ is acted upon by a spring, $g'$, which forces the lower or hooked end of the lever $g$ against a stud, $i$, and holds the catch in such position as to receive the bar $e$ and hold the levers G in the position indicated in red lines, Fig. 1. By drawing the upper end of the spring-catch lever forward it will release the levers G and allow the rear ends of the plow-beams to descend, so as to bring the plows into working position. By loosening the bolts which confine the beam C to the axle A and brace C', and loosening the bolts which confine one end of the seat to one of its posts, the beams C C and F F, together with the levers G G, can be separated or brought closer together at pleasure. By loosening the bolts which confine the beams C C and the draft-pole E to the axle A the entire frame-work of the machine can be adjusted toward or from the land-wheel without detaching said parts from their axle, or by loosening the bolts which confine the draft-pole to the axle A and brace C' this pole can be adjusted laterally independently of the frame-beams or plow-beams.

In practice I shall employ braces $h\,h$ for the plow-beams, and slot these braces to provide for adjusting the beams, so as to increase or diminish the distance between them.

J J are the plow-standards; and J' J' are the plows, which are secured in any suitable manner to their standards. These standards are slotted in a direction with their length, and secured to slotted sector-plates $j\,j$ at two points by means of bolts and nuts and also clamps $k^2\,k^2$, which latter embrace the standards and prevent them from breaking. The lower bolts, $k\,k$, secure the standards J J to inclined projections of the sector-plates $j\,j$, and constitute pivots about which the standards can be moved when the nuts of the upper bolts, $k'\,k'$, are loosened. These latter bolts pass through the slots which are made through the standards J J, and also through the slots through the plates $j\,j$, which latter are concentric with the axes of the bolts $k\,k$. By loosening the nuts of the bolts $k\,k'$ the plow-standards can be inclined at any desired angle, according to the pitch which it may be desired to give to the plow-points, and, if desirable, the standards can also be adjusted in a direction with their length, according to the depth which it may be desired to run the plows in the ground.

The clamps $k^2\,k^2$ are intended for strengthening the slotted standards and preventing them from springing or breaking should the plows strike an obstruction in their path.

By my invention I can readily adjust the frame of the machine for large or small plows or for plowing wide or narrow furrows. I can adjust the draft-pole according to the side draft on the machine, and I can adjust the plow-beams and supporting-frame nearer to or farther from the land-wheel, as occasion—all of which adjustments can be made without detaching any of the parts from the axle.

Having thus described my invention, what I claim as new, and desire to secure by Letters Patent, is—

1. The side bars, C C, seat-standards D D, slotted axle A, and slotted brace C', in combination with the pivoted plow-beams F F and rocking levers G G, all arranged and operating substantially as described.

2. In a wheel-cultivator, providing for expanding or contracting the plow-beams F F, the supporting-frame thereof, and the contrivances for elevating or depressing the said beams, substantially as described.

3. Supporting the plow-beams F F in an elevated position by means of levers G G, links $d\,d$, and a spring-catch lever, $g$, which is pivoted to a post projecting from the draft-pole, substantially as described.

4. Pivoting the plow-beams F to side beams, C C, which are susceptible of being separated or contracted without detaching them from their axle A, substantially as described.

5. The use of slotted standards J J, in combination with the slotted sector-plates $j\,j$ and fastenings $k\,k'$, substantially as described.

6. The clamps $k$, applied to the standards J, substantially as described.

Witness my hand in the matter of my application for a patent for gang-plow.

JOHN S. PADON.

Witnesses:
JULIUS WINKLER,
JOHN W. NICHOLS.